US007385791B2

(12) United States Patent
Ness

(10) Patent No.: US 7,385,791 B2
(45) Date of Patent: Jun. 10, 2008

(54) APPARATUS AND METHOD FOR RELAY CONTACT ARC SUPPRESSION

(75) Inventor: Keith D Ness, Winona, MN (US)

(73) Assignee: Wetlow Electric Manufacturing Group, St. Louis, MO (US)

(*) Notice: Subject to any disclaimer, the term of this patent is extended or adjusted under 35 U.S.C. 154(b) by 296 days.

(21) Appl. No.: 11/182,048

(22) Filed: Jul. 14, 2005

(65) Prior Publication Data

US 2007/0014055 A1 Jan. 18, 2007

(51) Int. Cl.
*H02H 3/00* (2006.01)

(52) U.S. Cl. .......... 361/8

(58) Field of Classification Search .......... 361/3, 361/4, 8

See application file for complete search history.

(56) References Cited

U.S. PATENT DOCUMENTS 3,260,894 A 7/1966 Denault
3,474,293 A 10/1969 Siwko et al.
3,543,047 A 11/1970 Renfrew
3,555,353 A 1/1971 Casson
3,558,910 A 1/1971 Dale et al.
3,639,808 A 2/1972 Ritzow
3,982,137 A 9/1976 Penrod
4,025,820 A 5/1977 Penrod
4,074,333 A 2/1978 Murakami et al.
4,152,634 A 5/1979 Penrod
4,225,895 A 9/1980 Hjertjan
4,246,621 A 1/1981 Tsukioka
4,251,845 A 2/1981 Hancock
4,296,449 A 10/1981 Eichelberger
4,389,691 A 6/1983 Hancock
4,420,784 A 12/1983 Chen et al.
4,438,472 A 3/1984 Woodworth
4,525,762 A 6/1985 Norris
4,598,330 A 7/1986 Woodworth
4,658,320 A 4/1987 Hongel
4,700,256 A 10/1987 Howell
4,704,652 A 11/1987 Billings
4,772,809 A 9/1988 Koga et al.
4,802,051 A 1/1989 Kim
4,855,612 A 8/1989 Koga et al.
4,864,157 A 9/1989 Dickey
4,939,776 A 7/1990 Bender (Continued)

*Primary Examiner*—Michael J Sherry
*Assistant Examiner*—Christopher J Clark
(74) *Attorney, Agent, or Firm*—Brinks Hofer Gilson & Lione

(57) ABSTRACT

An arc suppression circuit for a power switch or power supply with a relay having a coil and a set of contacts for providing a portion of an input power as load power to an output. The relay coil is configured for closing the relay contacts in response to receiving relay activating energy and for generating back EMF energy following termination of the receiving of the relay activating energy. A switch is connected in parallel to the relay contacts and is configured for providing a portion of the input power as supplemental load power to the output as a function of back EMF energy. Also, a method of suppressing damaging arcing across relay contacts in a power switch or power supply includes receiving back EMF energy generated by the relay coil following termination of the relay coil receiving activating energy and connecting supplemental load power to the output in parallel with the relay contacts in response to the receiving of the back EMF energy.

36 Claims, 4 Drawing Sheets

U.S. PATENT DOCUMENTS

| | | | |
|---|---|---|---|
| 5,536,980 | A | 7/1996 | Kawate et al. |
| 5,563,459 | A | 10/1996 | Kurosawa et al. |
| 5,633,540 | A | 5/1997 | Moan |
| 5,652,688 | A | 7/1997 | Lee |
| 5,699,218 | A | 12/1997 | Kadah |
| 5,737,172 | A | 4/1998 | Ohtsuka |
| 5,790,354 | A | 8/1998 | Altiti et al. |
| 5,793,589 | A | 8/1998 | Friedl |
| 5,886,860 | A | 3/1999 | Chen et al. |
| 5,889,645 | A | 3/1999 | Kadah et al. |
| 5,910,890 | A | 6/1999 | Hansen et al. |
| 5,933,304 | A | 8/1999 | Irissou |
| 6,046,899 | A | 4/2000 | Dougherty |
| 6,054,659 | A | 4/2000 | Lee et al. |
| 6,091,166 | A | 7/2000 | Olsen et al. |
| 6,291,909 | B1 | 9/2001 | Olsen |
| 6,603,221 | B1 | 8/2003 | Liu |
| 6,621,668 | B1 * | 9/2003 | Sare ............................ 361/13 |
| 6,624,989 | B2 | 9/2003 | Brooks, Jr. |
| 6,643,112 | B1 | 11/2003 | Carton et al. |
| 6,671,142 | B2 | 12/2003 | Beckert et al. |
| 6,687,100 | B1 | 2/2004 | Rice et al. |
| 6,690,098 | B1 | 2/2004 | Saldana |
| 6,707,171 | B1 | 3/2004 | Huenner et al. |
| 6,741,435 | B1 * | 5/2004 | Cleveland ...................... 361/2 |
| 7,145,758 | B2 * | 12/2006 | King et al. .................... 361/3 |
| 2002/0075621 | A1 | 6/2002 | Elliott |
| 2003/0193770 | A1 * | 10/2003 | Chung ........................ 361/118 |
| 2004/0165322 | A1 | 8/2004 | Crawford et al. |
| 2004/0179313 | A1 | 9/2004 | Cleveland |

* cited by examiner

APPARATUS AND METHOD FOR RELAY CONTACT ARC SUPPRESSION

FIELD OF THE INVENTION

The present invention relates to a circuit for use in a power supply and, more specifically, relates to a circuit or power supply capable of having reduced harmful arcing across contacts of a relay providing output power.

BACKGROUND OF THE INVENTION

Power supplies often utilize relays for switching on and off power provided to an output of the power supply and therefore to a load. Relays are used due to the low resistance and therefore power dissipation of the relay contacts as compared to alternative switching devices, such as solid state relays, that have significantly higher voltage drops across the closed switch. However, the mechanical relays often degrade, at least in part, due to harmful arcing across the relay contacts that result from the relay contacts being powered before and after the opening and closing. Arcing often occurs across the relay contacts during the closing of the contacts, but prior to the relay contacts making physical contact. Similarly, arcing often occurs across the relay contacts after the contacts have initially separated, but prior to the separation distance being sufficient to break the energy flow across the relay contacts. Such arcing can cause damage to the relay contacts such as pitting of the relay contacts and are the primary cause of relay breakdown. This arcing is well known to cause early failure of the relay contacts and the need for replacement of the relays.

Heretofore, attempts to reduce the harmful and damaging contact arcing and bounce have involved mechanical apparatus such as bias springs and cams, and various electronic circuits including solid state devices such as transistors. These typically have focused on reducing or eliminating all arcing across the relay contacts, both during the closing of the contacts and the opening of the contacts. Typically, these electronic circuits have included complex and expensive solid state components that sense or detect the presence of arcing across the relay contacts and reduce the power at the relay contacts, thereby reducing the energy available for arcing. For example, electronic circuits have been designed to sense the pending closure of the relay contacts and remove or redirect the power away from the switch contacts until the contacts have made physical contact. Circuits also have been developed that sense or operate to reduce or remove the power from the relay contacts immediately prior to and during the separation from each other. Other circuits have been designed that provides a solid state relay circuit in parallel with mechanical relay contacts that often use specialized control circuitry, a triac, and/or digital circuitry. Many of the attempts to eliminate arcing having attempted to suppress arcing at both the closing and opening of the relay contacts, as generally, heretofore, all contact arcing was considered to be harmful.

Each of these has had the objective of providing a more reliable power supply circuit by increasing the life of the relay contacts. However, each of these have required considerable incremental complexity and cost to the power supply implementation. Additionally, many of these solutions do not provide a well-defined optimal turn-on and turn-off of the semiconductor switch.

SUMMARY OF THE INVENTION

The inventors hereof have succeeded at designing a circuit for use in a power supply that suppresses damaging arcing across relay contacts providing output power while allowing for a cleaning arc across the relay contacts. The inventors hereof have recognized that arcing during the closing of the relay contacts provides a beneficial contact cleaning operation and that arcing during opening of the contacts is the harmful arcing that should be eliminated. As will be discussed and shown below, the various embodiments of the invention provide an improved apparatus and method for a power supply having a relay that has an extended relay life and therefore reduced costs for the power supply user. These benefits are provided in an optimal manner with only minimal incremental costs, but with significantly lower implementation costs than prior art systems and methods.

According to one aspect of the invention, an arc suppression circuit for a power switch includes a relay having a coil and a set of contacts for providing a portion of an input power as load power to an output. The relay coil is configured for closing the relay contacts in response to receiving relay activating energy and for generating back EMF energy following termination of the receiving of the relay activating energy. A switch is connected in parallel to the relay contacts and is configured for providing a portion of the input power as supplemental load power to the output as a function of back EMF energy.

According to another aspect of the invention, a power supply having a relay for providing power to a load includes an input power source for providing load power and an output configured for providing the load power to a load coupled to the power supply. A relay has an activating coil and a set of relay contacts for providing a portion of the load power to an output. The relay coil is configured to close the relay contacts in response to receiving relay activating energy and generate back EMF energy following termination of the receiving of relay activating energy. A switch is connected in parallel to the relay contacts and is configured to provide a portion of the load power to the output as supplemental load power as a function of the back EMF energy generated by the relay coil.

According to yet another aspect of the invention, a power supply includes an input power source for providing load power and an output configured for providing the load power to a load coupled to the power supply. A relay has a set of relay contacts for providing a portion of the load power to the output and an activating coil for closing the relay contacts in response to receiving relay activating energy. A relay power source is coupled to the relay coil for selectively providing current limited relay activating energy to the relay coil. Also included is a means for receiving back EMF energy generated by the relay coil following termination of the relay receiving relay activating energy. A switch is connected in parallel to the relay contacts and is configured to provide a supplemental portion of the load power to the output in response to receiving the back EMF energy.

According to still another aspect, the invention is a method of suppressing damaging arcing across relay contacts in a power switch having a relay with a set of relay contacts providing a portion of input power to an output and a relay coil configured to control the set of relay contacts in response to receiving relay coil activating energy, and an auxiliary switch connected in parallel to the relay contacts and configured to provide supplemental load power to the output, the supplemental load power being a portion of the input power. The method includes receiving back EMF energy generated by the relay coil following termination of the relay coil receiving activating energy and connecting the supplemental load power to the output in parallel with the relay contacts in response to the receiving of the back EMF energy.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

The following description is merely exemplary in nature and is in no way intended to limit the invention, its applications, or uses.

In one embodiment of the invention, an arc suppression circuit for a power circuit or power supply includes a relay having a coil and a set of contacts for providing a portion of an input power as load power to an output. The relay coil is configured for closing the relay contacts in response to receiving relay activating energy and for generating back EMF energy following termination of the receiving of the relay activating energy. A switch is connected in parallel to the relay contacts and is configured for providing a portion of the input power as supplemental load power to the output as a function of back EMF energy.

Figure 1:
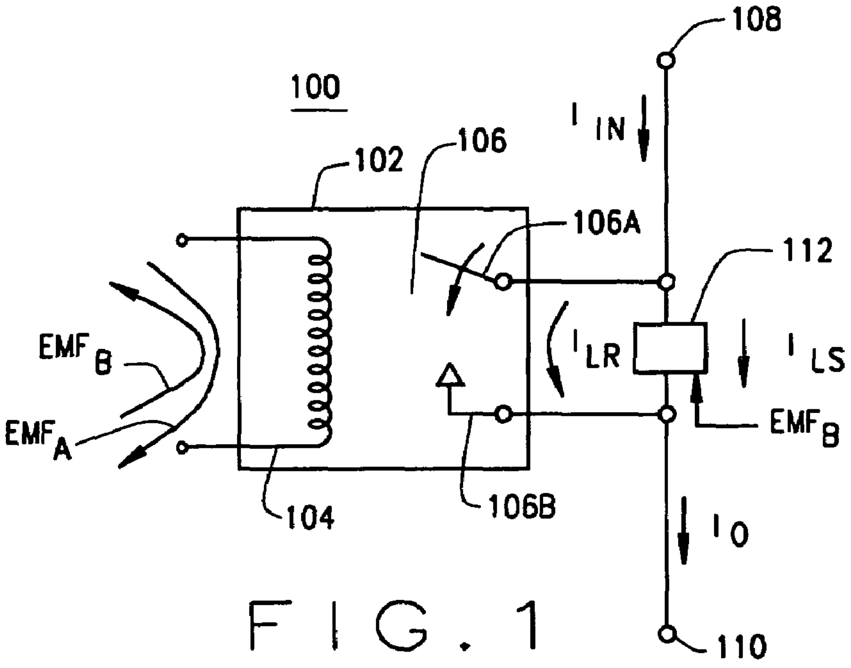
FIG. 1 is a circuit diagram of an arc suppression circuit according to a first exemplary embodiment of the invention.

Referring to FIG. 1, one exemplary embodiment of an arc suppression circuit 100 is illustrated. An electromechanical relay 102 includes a relay coil 104 that operates to open and close the relay contacts 106 (shown to include two relay contacts 106A and 106B). The relay contacts 106 are connected between an input 108 and an output 110 for selectively providing a relay load current portion $I_{LR}$ that is a portion of the input energy (shown as input current $I_{IN}$) to the output 110 as output energy (shown as output current $I_O$). The $I_{IN}$ is provided by the relay contacts 106 when the relay contacts 106 are closed.

Typically, the relay contacts 106 are normally open and close when the relay coil 104 receives relay activating energy $EMF_A$. The relay coil 104 is energized and the relay contacts 106 pull in to make contact. The relay coil 104 acts as an inductor and stores a portion of the relay activating energy $EMF_A$. The closure of the relay contacts 106 often result in a bounce of the relay contacts 106. The closure of the relay contacts 106 and the contact bounce provide a beneficial cleaning arc to occur across the relay contacts 106. The inventors of the present invention have determined that arcing during the closing of the relay contacts 106 improves the life of the relay contacts 106. This is contrary to previous arc suppression teachings that attempted to suppress all relay contact arcing. As such, the various embodiments of the invention are focused on suppressing arcing during opening of the relay contacts 106 and allow arcing during closing.

After the relay activating energy $EMF_A$ is terminated or no longer received by the relay coil 104, the relay coil 104 releases the stored energy as back electromotive force $EMF_B$. The inductive kick energy flow as provided by the back electromotive force $EMF_B$ flows is in reverse direction through the relay coil 104 as compared to the relay activating energy $EMF_A$. As a result, the polarity of the poles of the relay coil 104 reverse during the release of the back electromotive force $EMF_B$.

A switch 112 is also connected to the input 108 and the output 110 in parallel with the relay contacts 106. The switch 112 provides, at least a portion of, the input current $I_{IN}$ as supplemental load current $I_{LS}$ to the output 110 as output current $I_O$. As such, the output current $I_O$ is composed of relay load current $I_{LR}$ and supplemental load current $I_{LS}$, which can be provided coincidentally within output current $I_O$ or on a mutually exclusive basis, e.g., one or the other. The switch 112 provides the supplemental load current $I_{LS}$ to the output as a function of the $EMF_B$ generated by the relay coil 104 following deactivation after termination of the relay coil 104 receiving relay activating energy ($EMF_A$). In some implementations, the switch 112 directly receives the $EMF_B$ and utilizes the $EMF_B$ to close. In other implementations, a triggering or isolation circuit can couple the generated $EMF_B$ to the switch 112 such that the switch 112 closes as a function of the $EMF_B$.

In operation, the mechanical relay contacts 106 do not immediately open at the termination of the relay coil 104 receiving the relay activating energy. The relay coil 104 generates the $EMF_B$ prior to the opening of the relay contacts 106. The switch 112 closes and provides the supplemental load current $I_{LS}$ immediately prior to, or approximately at about the same time, that the relay contacts 106 open and terminate the providing of the relay load current $I_{LR}$. In fact, in some embodiments the switch 112 is configured to close at the same instance in time that the relay contacts 106 open. The switch 112 conducts or redirects the input power $I_{IN}$ away from contact 106A thereby reducing or eliminating the energy from the contact 106A. In this manner, the switch 112 continues to provide at least a portion of the $I_{IN}$ to the output 110 as $I_O$ during the opening of contacts 106. The back EMF energy stored by the relay coil 104, however, dissipates as a function of the electrical characteristics such that the arc suppression circuit 100 provides for the opening of switch 112 after the relay contacts 106 have mechanically separated and after the likelihood of post opening arcing across the relay contacts 106. After the back EMF energy (shown as back current $I_B$) has dissipated or reduced down to a threshold level, the switch 112 opens thereby terminating the providing of input power $I_{IN}$ from the input 108 to the output 110.

The arc suppression circuit 100 of FIG. 1 can be used to switch either a direct current (DC) input power $I_{IN}$ or one or more phases of alternating current (AC). When switching or providing multiple phases of AC, typically a separate relay 102 and a separate associated switch 112 in parallel with the relay 102 are provided for each switch AC phase.

In some embodiments, one or more back current $I_B$ energy detecting or receiving components can be coupled to the relay coil 104, such as in parallel to or series with the relay coil 104, to detect or receive the back current $I_B$ energy generated by the relay coil 104 following termination of the receiving of activating current $I_A$. Such detecting or receiving components can directly control the switch 112 or provide a command signal to the switch for controlling the switch for providing the supplemental load power shown as supplement current $I_{LS}$. In some embodiments of the arc suppression circuit 100, the input power $I_{IN}$ can be one or more phases of AC power. In such embodiments, the switch 112 can be a triac and the back EMF energy receiving component can include an opto-triac driver. Where the input power $I_{IN}$ is DC power, the switch 112 can be a transistor and the back EMF energy receiving component can also include a transistor. It should be apparent to those skilled in the art, that other similarly functioning electronic components and circuitry can also be utilized and still be within the scope of the invention.

The switch 112 is configured to respond to the receipt of the command signal or gating pulse and provide the supplement current $I_{LS}$ in response to the command signal. In one embodiment, the back EMF energy receiving component includes a diode coupled in series with the relay coil 104 and configured to receive back current $I_B$ generated by the relay coil 104. In other embodiments, an opto-switch can also be utilized between a diode that receives the back EMF energy and the switch that provides the supplemental load power $I_{LS}$. This is particularly beneficial when the input power source provides AC load power since the opto-switch can provide isolation between AC load power and the back EMF energy receiving components and/or the relay coil activating current circuits.

While not shown in FIG. 1, in other embodiments, arc suppression circuit 100 can include a relay power source that is configured to provide the relay activating energy $EMF_A$ to the relay coil 104. The relay coil 104 is then operable to close the relay contacts 106 in response to receiving relay activating energy $EMF_A$ from the relay power source. In some embodiments, the relay power source can include a current limiting circuit to provide a generally constant or current limited relay activating energy to the relay coil 104. The current limiting circuit can provide a constant activation current level to stabilize the value of the activation current $I_A$ over variations in the relay activating power source and the resistance of the relay coil 104 that often varies due to the ambient temperature and the temperature of the relay coil 104.

According to another embodiment of the invention, a power supply having a relay for providing power to a load includes an input power source for providing load power and an output configured for providing the load power to a load coupled to the power supply. A relay has an activating coil and a set of relay contacts for providing a portion of the load power to an output. The relay coil is configured to close the relay contacts in response to receiving relay activating energy and generate back EMF energy following termination of the receiving of relay activating energy. A switch is connected in parallel to the relay contacts and is configured to provide a portion of the load power to the output as supplemental load power as a function of the back EMF energy generated by the relay coil.

In yet another embodiment of the invention, a power supply includes an input power source for providing load power and an output configured for providing the load power to a load coupled to the power supply. A relay has a set of relay contacts for providing a portion of the load power to the output and an activating coil for closing the relay contacts in response to receiving relay activating energy. A relay power source is coupled to the relay coil for selectively providing current limited relay activating energy to the relay coil. Also included is a means for receiving back EMF energy generated by the relay coil following termination of the relay receiving relay activating energy. A switch is connected in parallel to the relay contacts and is configured to provide a supplemental portion of the load power to the output in response to receiving the back EMF energy.

Figure 2:
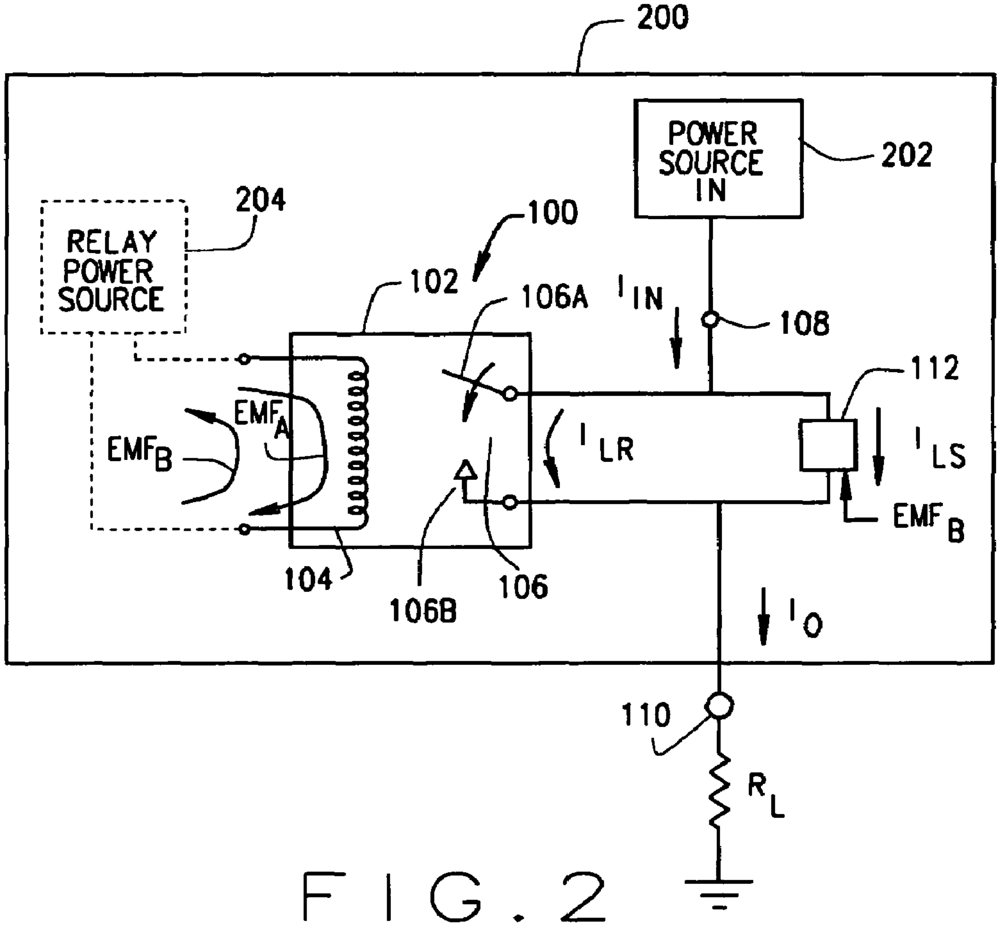
FIG. 2 is a circuit diagram of a power supply implementing the arc suppression circuit of FIG. 1 according to one implementation.

While the arc suppression circuit 100 of FIG. 1 can be implemented as a standalone circuit for selectably switching power from a source to a load, in another exemplary embodiment, the arc suppression circuit 100 can be implemented within a power supply 200 as shown in FIG. 2. As shown, an input power source 202 is coupled to the input 108 for providing input power $I_{IN}$. The output 110 is configured such that a load $R_L$ can be coupled to the power supply 200 for receiving the output power $I_O$. In some embodiments, a relay power source 204 can also be provided for generating and/or providing the relay activating energy $EMF_A$ for closing the relay contacts 106 and for providing the energy to the coil 104 that can be stored by the coil 104 and later generated by the relay coil 104 as back electromotive force $EMF_B$ for closing switch 112.

Figure 3:
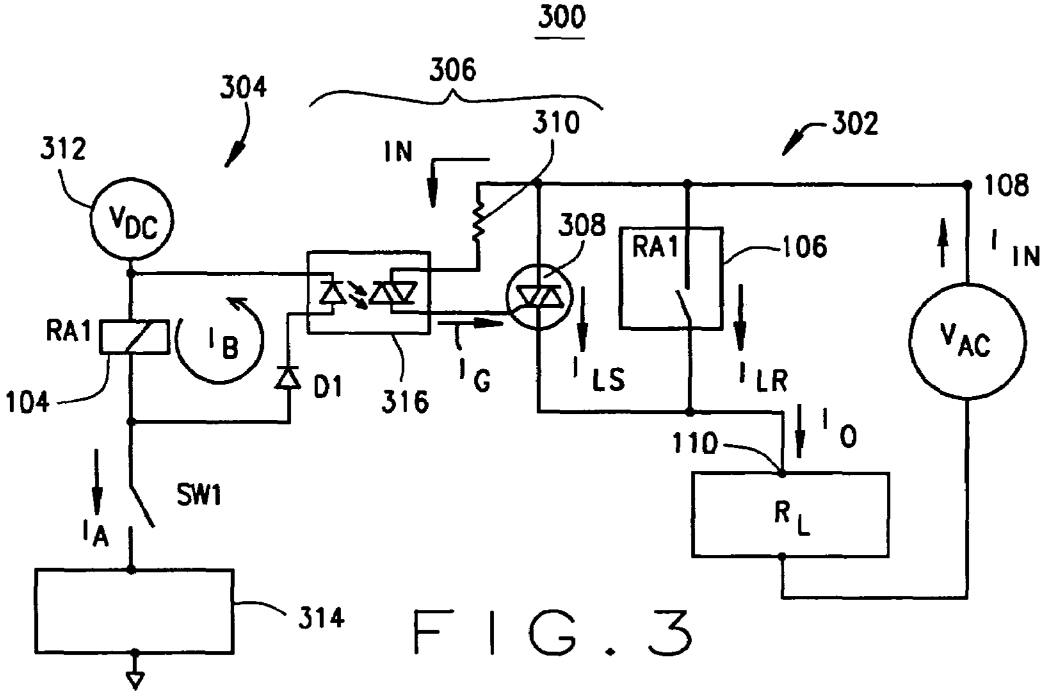
FIG. 3 is a circuit diagram of an AC power supply according to a second exemplary embodiment of the invention.

Referring now to FIG. 3, a power supply circuit 300 with a relay and with an arc suppression circuit is illustrated for switching AC power to a load according to another embodiment of the invention. For discussion purposes, in FIG. 3 the AC power supply circuit 300 illustrates the components of the relay RA1 separately and not combined within a relay unit as shown in FIGS. 1 and 2, e.g., the relay coil is shown as a circuit element of the relay activating circuit portion and the relay contacts 106 are shown as a circuit element in the load power circuit portion. It should be understood to those skilled in the art that this is shown for discussion purposes only and is not intended to be shown as a preferred embodiment or implementation.

The AC power supply circuit 300 is composed of three sub-circuits or portions: a load power circuit 302 for selectively providing output power (indicated as output current $I_O$) from the load power supply $V_{AC}$ (or input receiving load power $V_{AC}$) to a load $R_L$; a relay activating circuit 304 for selectively providing relay activating current $I_A$ to a relay coil 104; and a supplemental power control circuit 306. The load power circuit 302 includes relay contacts 106 connected between the load power supply $V_{AC}$ and the output 110 on which the load $R_L$ is coupled. When relay contacts 106 are closed, the relay load current $I_{LR}$ is provided to output 110 as output current $I_O$. Additionally, a solid state triac switch 308 is coupled in parallel to the relay contacts 106 and between the input 108 and the output 110 for selectively providing at least a portion of the input power $I_N$ as supplemental load power $I_{LS}$ to the load $R_L$.

The relay activating circuit 304 includes a relay activating power source 312 that typically provides DC relay activating current $I_A$ to relay coil 104 when a relay activating switch SW1 is closed. Additionally, in some embodiments a current limit circuit 314 can provide a limiting function to the relay activating current $I_A$. The current limit circuit 314 can provide a constant current at a activation current level to stabilize the value of the activation current $I_A$ over variations in the relay activating power source 312 and the resistance of the coil 104 that varies due to the ambient temperature and the temperature of the relay coil 104. As will be discussed in greater detail below, the relay activating circuit 304 is configured to activate the relay coil 104 to close the relay contacts 106 thereby providing a portion of the input power $I_{IN}$ as the relay load current $I_{LR}$ to the output 110.

The supplemental power control circuit 306 is coupled to the relay activating circuit 304 for receiving the back EMF energy $EMF_B$ in the form of back current $I_B$, as shown in FIG. 3, for closing the triac solid state switch 308 within the load power circuit 302 for providing a portion of the input power $I_{IN}$ to the output 110 as switch load current $I_{LS}$. A diode D1 is coupled to the ground side (non-DC power side) of the relay coil 104. The diode D1 is reverse biased during the providing of the relay activating current $I_A$ and is forward biased to receive the back electromotive force $EMF_B$ as back current $I_B$ after switch $SW_1$ is opened. An opto-triac driver 316 is coupled to the diode D1 to receive the back current $I_B$ during the forward biasing of diode D1, thereby driving an optical generator on the receiving portion within the opto-triac driver 316. The opto-triac driver 316 can be of any type but, in one embodiment, is a random firing opto-triac driver. The opto-triac driver 316 provides for generating the triac gating signal. The opto-triac driver 316 also can provide an electrical isolation between the load power circuit 302 and the relay activating circuit 304, thereby providing for an improved stable control and timing of the providing of the supplemental load power $I_{LS}$. The optically generated signal (typically provided by a light emitting diode or similar device) is provided within the opto-triac driver 316 to the output portion of the opto-triac driver 316 that generates a triac gate current $I_G$. The triac 308 is configured to close to provide electrical conductivity between the input power source $V_{AC}$ and the load in parallel to the relay contacts 106 when receiving the triac gate current $I_G$ from the opto-triac driver 316. Those skilled in the art understand that other drivers and isolation components can also be utilized and still be within the scope of the current invention.

The triac gate current $I_G$ generated by the opto-triac driver 316 is, at least in part, generated when the back current $I_B$ is greater than the minimum current requirements of the opto-triac driver 316. The level of the back current $I_B$ over time is a function of various electrical characteristics that can include the relay coil voltage, the relay coil inductance, the time rate of change of the relay coil current, the voltage drops across the diode D1 and the opto-triac driver receiving portion, and the activation current level $I_{AL}$. In an AC power switch arrangement, the triac driver 316 should be selected and configured such that the triac 308 turns on immediately and should not be delayed until a zero crossing of an AC power line. Those skilled in the art will understand that the triac driver 316 should control the triac 308 such that the triac 308 is energized and provides the supplemental load current $I_{LS}$ before the relay contacts physically separate. In other words the supplemental load current $I_{LS}$ open should not be delayed for a period of time that is greater than the relay contact dropout time to prevent the destructive arcing across the relay contacts 106 during opening.

The opto-triac driver 316 is selected such that the back current $I_B$ is sufficient for the opto-triac driver 316 to generate the triac gate current $I_G$ for a sufficient period of time that is greater than the relay contact dropout time, e.g., the time between the termination of the relay activation current $I_A$ being supplied to the relay coil 104, and the physical opening of the relay contacts 106. The current limit circuit 314 and/or the activation current $I_A$ must not only be sufficient to close the relay contacts 106, but also to store sufficient electromotive force in the relay coil 104 to generate a sufficient level of back $EMF_B$ to produce the proper level of back current $I_B$ to flow through the diode D1 and trigger the opto-triac driver 316 to generate the triac gate current $I_G$.

The load power supply $V_{AC}$ is coupled to the opto-triac driver 316 of the supplemental power control circuit 306 through an impedance 310 to provide a contact open current portion $I_N$ of the input power current $I_{IN}$. The opto-triac driver 316 receives both the back current $I_B$ and the contact open current portion $I_N$ and generates a triac gate current $I_G$ to the triac 308. The triac 308 receives the triac gate current $I_G$ and closes to provide the electrical conductivity for providing the supplemental current $I_{LS}$ to the output 110. In operation, when the relay contacts 106 are closed, the relay contacts 106 provide a low loss between the input 108 and the output 110 relative to the loss incurred across a semiconductor switch. As such, the opto-triac driver 316 blocks the flow of current from the input 108 through the impedance 310 until the diode receives and provides the back current $I_B$ to the opto-triac driver 316 following the termination of the activating current $I_A$. When the contacts 106 open the current portion $I_N$ begins to conduct through the impedance 310 and is received by opto-triac driver 316. In this exemplary embodiment, the opto-triac driver 316 generates the triac gate current $I_G$ in response to receiving the back current $I_B$ from the diode D1 and the contact open current portion $I_N$ from the impedance 310. In such an embodiment, the supplemental current $I_{LS}$ is only provided at the opening of the relay contacts 106 and until the back current $I_B$ reduces to a predefined level.

In other embodiments, the opto-triac driver 316 generates the triac gate current $I_G$ in response only to receiving the back current $I_B$ from the diode D1. In such an embodiment, the supplemental current $I_{LS}$ is provided prior to (and in some embodiments, immediately prior to) the opening of the relay contacts 106 and is provided during the opening of the relay contacts 106 until shortly after the opening of the relay contacts 106 when the back current $I_B$ reduces to a predefined level. As such, in the various embodiments, the providing of the supplemental current $I_{LS}$ can be adjusted or tailored to a particular implementation or design need based on specification of the diode D1, the relay coil 104, the activation current $I_A$, the opto-triac driver 316, the impedance 310, and the triac 308. Those skilled in the art understand that the specification of these components and their electrical values determine the timing of the providing of the supplemental current $I_{LS}$ in conjunction with the opening of the relay contacts 106.

Figure 4:
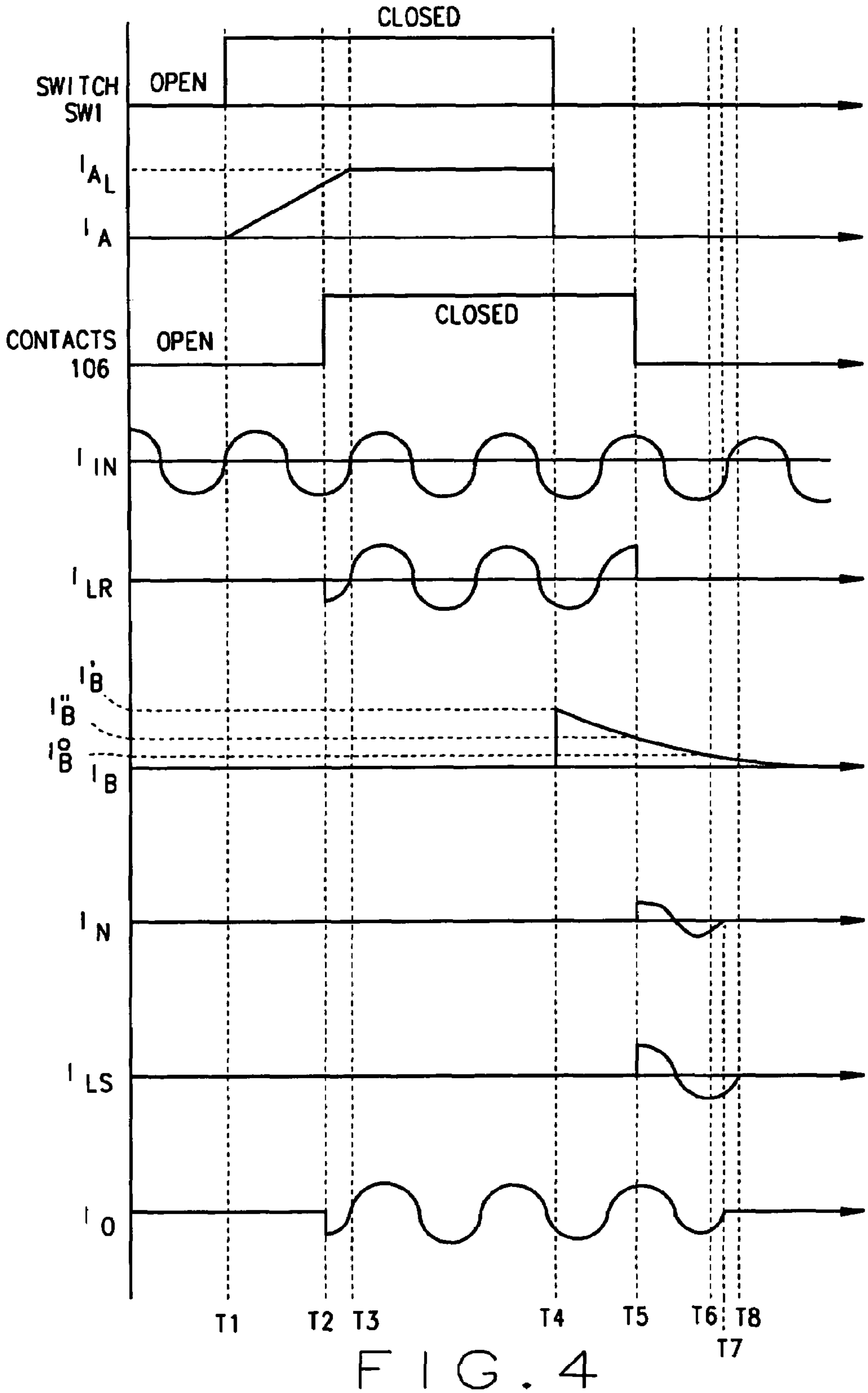
FIG. 4 is a timing diagram for an AC power supply according to one exemplary implementation of the power supply of FIG. 3.

The operation of power supply circuit 300 with the arc suppression circuit and method is illustrated by the representative timing diagram in FIG. 4. As shown in FIG. 4, the operation of the power supply circuit 300 can begin with the closing of the switch SW1 at time T1. Prior to this time, no power is provided as output power $I_O$ as illustrated in FIG. 4. At time T1, the SW1 closes and the activation current $I_A$ begins to increase until time T2 where the activation current $I_A$ in the relay coil 104 is sufficient to mechanically close the relay contacts 106. When relay contacts 106 close (as illustrated by timeline "Contacts"), a portion of the input power $I_{IN}$ is electrically conducted by relay contacts 106 to provide relay load current $I_{LR}$ as output power $I_O$. From time T2 to time T3, the activation current $I_A$ continues to increase above the mechanical closing threshold until an activation current limit $I_{AL}$ is reached. The current limiter 314 maintains the activation current $I_A$ and the activation current level $I_{AL}$ for the duration of the time T2 when the switch SW1 is closed until time T4 when the switch SW1 is opened.

At time T4, the switch SW1 is opened and the activation current $I_A$ is terminated or reduced to zero. At this time, the relay coil 104 no longer receives activation current $I_A$ and begins to discharge back current $I_B$ during the collapsing of the magnetic field and therefore the energy stored in the relay coil 104. The back current $I_B$ begins to discharge from a level $I'_B$ that is equal to or associated with the activation current level $I_{AL}$. The back current $I_B$ is conducted through the diode D1 that is forward biased and provided to the receiving portion of the opto-triac driver 316. The receiving portion of the opto-triac driver 316 generates an optical signal to the output driver within the opto-triac driver 316. However, in the present exemplary embodiment, the opto-triac driver 316 does not yet generate the triac gate current $I_G$ because the relay contacts 106 remain closed at time T4 even though switch SW1 has been opened, since the residual energy within the relay coil 104 has not dissipated to the level to open the relay contacts 106.

At time T4, the back current $I_B$ dissipates from the relay coil 104 from time T4 until it reaches zero as indicated by the $I_B$ timeline. During the dissipation of the back current $I_B$ from the relay coil 104, based on the design of the relay coil 104 and the electromechanical characteristics of the relay RA1, the relay contacts 106 open at T5 when the back current $I_B$ has reduced to a contact opening threshold level $I''_B$. The delay between time T4 and T5 is often referred to as the release time of the relay. When the relay contacts 106 open at T5, the relay load current $I_{LR}$ ceases to be provided to the output 110.

Also at T5, the impedance 310 begins to conduct a portion of the input power $I_{IN}$ to the opto-triac driver 316 as the contact open current portion $I_N$. When the opto-triac driver 316 receives the contact open current portion $I_N$ at time T5, having already received the back current $I_B$ from the diode D1 at T4, the triac gate current $I_G$ is generated and provided to the gate of the triac 308. The triac 308 closes upon receipt of the triac gate current $I_G$ at time T5 and provides a portion of the input power $I_{IN}$ as the supplemental current $I_{LS}$ beginning at time T5 to the output 110 as output power $I_O$. As the output power $I_O$ is composed of both the relay load current $I_{LR}$ and the supplemental current $I_{LS}$, the output power $I_O$ continues from time T2 to after time T5 uninterrupted by the opening of the relay contacts 106. However, as the triac 308 begins to conduct a portion of the input power $I_{IN}$ at time T5, the input power $I_{IN}$ is removed from the relay contacts 106 thereby minimizing and/or eliminating arcing across the relay contacts 106 during and after opening.

Following time T5, the back current $I_B$ continues to dissipate through the diode D1 and the receiving portion of the opto-triac driver 316 until the back current $I_B$ is reduced to a threshold level $I^O$B. At the threshold level $I^O$B, the back current $I_B$ has reduced to the level at time T6 that the receiving portion of the opto-triac driver 316 discontinues transmitting the internal optical signal as dictated by the electronic design of the opto-triac driver 316. At the time T7, following the time T6, the opto-triac driver 316 discontinues generating the triac gate current $I_G$ to the triac 308. Shortly after time T7 when the triac gate current $I_G$ is no longer received by the triac 308, the triac 308 opens at time T8 and discontinues providing the supplemental load current $I_{LS}$ to the output as output power $I_O$. As such, at time T8 the output power $I_O$ is terminated. In some embodiments where the input power $I_{IN}$ is AC power, the supplemental load current $I_{LS}$ to the output as output power $I_O$ is terminated within one half of an AC cycle.

Figure 5:
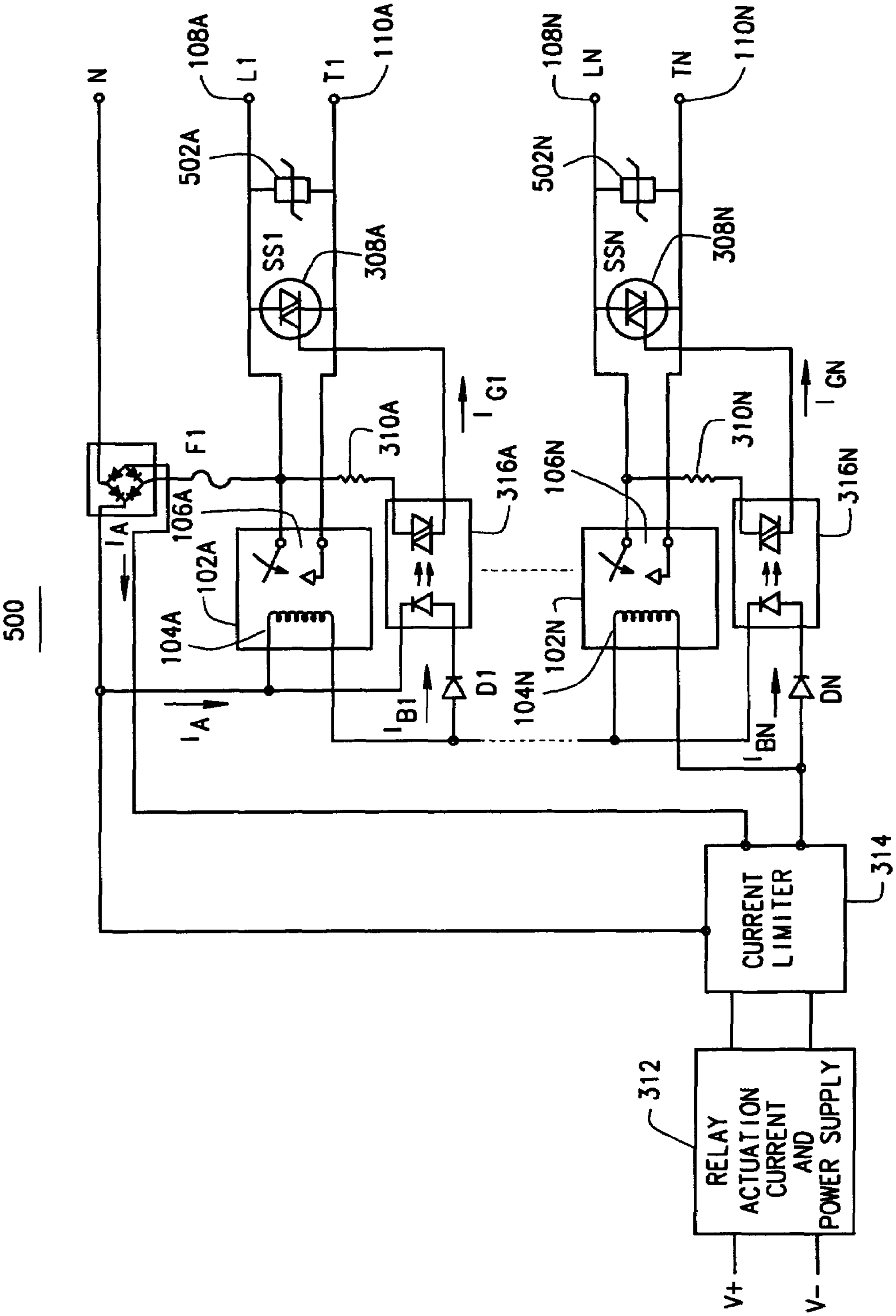
FIG. 5 is a circuit diagram for a multi-phase AC power supply according to a third exemplary embodiment of the invention.

Referring now to FIG. 5, an AC power supply circuit 500 illustrates another exemplary embodiment of the invention. The power supply circuit 500 has multiple load power switching legs A to N, for switching a plurality of phases of the AC supply power as received as input power at inputs 108A, 108N and as provided as output current at outputs 110A, and 110N, respectively. Additionally, a metal oxide varistor 502 can be connected in parallel to each of the relay contacts 106N and each triac 308N to provide surge protection to protect the triac 308N from surges in the load power. One or more of these can utilized in various embodiments as those skilled in the art will recognize.

In one common embodiment of the AC power supply circuit 500, the input power is three phase AC power. A first relay 102A and a parallel first switch 308A switch one of the three phases of the AC power. A second relay 102B and a parallel second switch 308B switch a second of the three phases, and a third relay 102C and a parallel third switch 308C switch the third phase of the three phases of the AC power. Each phase has an associated diode $D_N$ and opto-triac driver for receiving the back EMF energy from one phase and selectively switching the associated switch 308 as described herein. In some other embodiments, one or more of the discreet components illustrated in FIG. 500 can be combined or provided as fewer or more components than illustrated and described herein.

Figure 6:
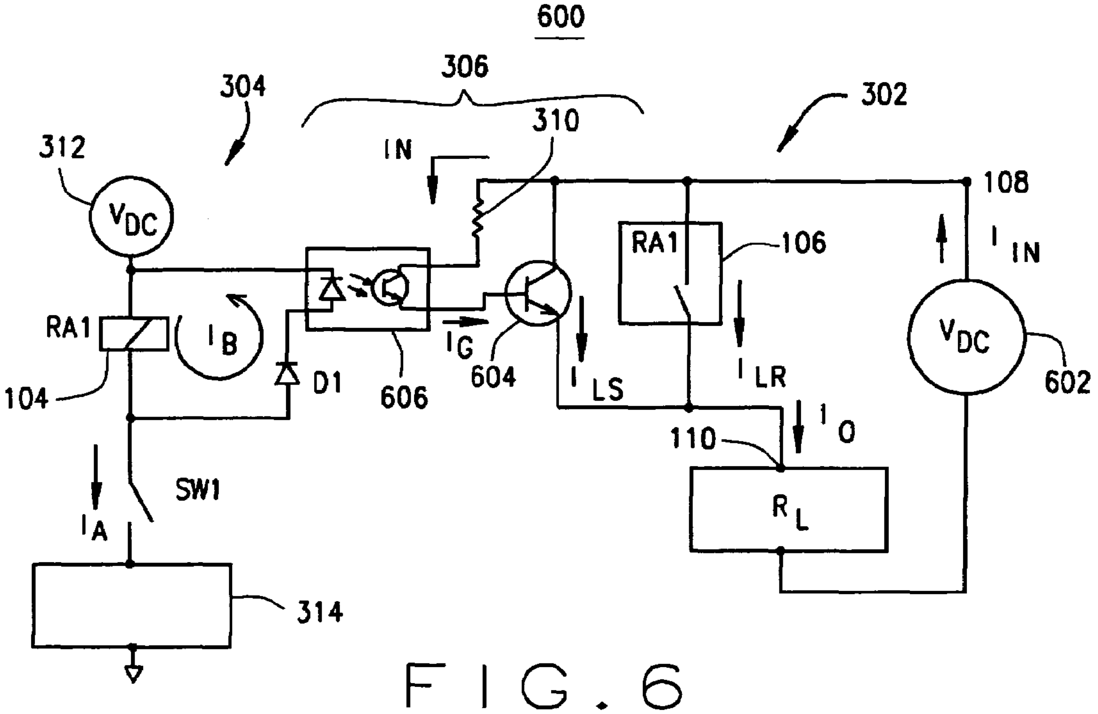
FIG. 6 is a circuit diagram for a DC power supply according to a fourth exemplary embodiment of the invention.

As noted above, some embodiments of the invention can provide for the switching or supply of DC voltage to an output or load. One exemplary embodiment of a DC arc suppression circuit 600 is illustrated in FIG. 6. The DC arc suppression circuit 600 is similar to the AC arc suppression circuit 300 discussed above and shown in FIG. 3. The input power source 602 is a DC power source providing a DC input current $I_{IN}$. The relay contacts 106 couple the DC input current $I_{IN}$ to provide DC relay load current $I_{LR}$ as output current $I_O$. The supplemental load current $I_{LS}$ is provided by a solid state switch that is a transistor 604. The transistor 604 is controlled by an opto-transistor driver 606. In this embodiment, the diode D1 is coupled in series with the relay coil 104 and is configured to receive back EMF energy (e.g., back current $I_B$) from the relay coil 104. The diode D1 can provide the back current $I_B$ to the opto-transistor driver 606 or, in some embodiments, directly to the transistor 604. The transistor 604 is either directly or indirectly responsive to the back current $I_B$ provided by the diode D1 and switches on to provide at least a portion of the input current $I_{IN}$ as the supplemental load current $I_{LS}$ to the output 110. Other operations of arc suppression circuit 600 can be similar to those as discussed above with regard to one or more of the various other embodiments of the invention.

Another embodiment of the invention includes a method of providing for the suppression of harmful or damaging arcing across the relay contacts in a power switch or power supply. The relay includes a set of relay contacts that provides at least a portion of input power (either AC or DC input power) to an output and a relay coil configured to control the set of relay contacts in response to receiving relay coil activating energy. A switch is connected in parallel to the relay contacts and is configured to provide supplemental load power to the output. The supplemental load power is also at least a portion of the input power. The method further includes receiving back EMF energy generated by the relay coil following termination of the relay coil receiving activating energy and connecting the supplemental load power to the output in parallel with the relay contacts in response to the receiving or as a function of the back EMF energy.

In such a method, beneficial arcing that cleans the relay contacts is allowed during the closing of the relay contacts. However, the input power is removed from the contacts immediately prior to or in conjunction with the opening of the relay contacts, thereby minimizing or suppressing arcing across the relay contacts during opening. By minimizing or suppressing the arcing at opening but allowing arcing at closing, the embodiments of the present invention provide for improved performance of the relay contacts and can increase the working life of the relay contacts.

The method can also include generating a control signal in response to the receiving of the back EMF energy generated by the relay coil. When the control signal is generated and received by the switch, the supplemental load power is provided or connected to the output by the switch. For example, in some embodiments, the control signal is generated to include a gating pulse that is indicative of, or is associated with, the opening of the relay contacts or the pending opening of the relay contacts, e.g., immediately prior to the physical opening of the relay contacts. The gating pulse can also be terminated following the opening of the relay contacts.

In some embodiments, where the input power is AC power, or at least one phase of AC power, the supplemental load power can be terminated or disconnected from the output in parallel within one half of an AC cycle following the back EMF energy being equal to a threshold level. In some cases, the method includes monitoring or comparing the back EMF energy to a threshold, either actively or passively. As a result of the monitoring and/or comparing, when the back EMF is equal to or less than the threshold EMF energy level, the providing of the supplemental load power is terminated.

In another embodiment, the method can include generating the relay activating energy for the relay coil. The activating energy can have various electrical parameters. In one embodiment, the activating energy is an activating current that includes a current limiter. In such an embodiment, the current limited activating energy or current can provide an improved level of relay coil activation and an improved predetermined level of initial back EMF energy and/or the slope of decay of such back EMF energy. This can result in a more stable and consistent performance of the providing and disconnecting of the supplement load current before, during and after opening of the relay contacts.

Those skilled in the art will understand that variations of components or packaging of electrical components, discrete elements or functions thereof can be implemented with more or fewer electrical components and still be within the scope of the current invention. By way of example, in a three-phase AC power arrangement, some electrical components or functions can be combined such that all three phases of power are switched with few components. In other embodiments, more or fewer coils, relay contacts, contactors, diodes, semiconductor switches, or switch drivers may be implemented consistent with the aspects of the invention described herein.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

It is further to be understood that the processes and/or steps described herein associated with the methods are not to be construed as necessarily requiring their performance in the particular order discussed or illustrated. It is also to be understood that additional or alternative processes and/or steps may be employed.

What is claimed is:

1. An arc suppression circuit for a power switch, the circuit comprising:

a relay having a coil and a set of contacts for providing a portion of an input power as load power to an output, the relay coil configured for closing the relay contacts in response to receiving relay activating energy and for generating back EMF energy following termination of the receiving of the relay activating energy; and a switch connected in parallel to the relay contacts and configured for providing a portion of the input power as supplemental load power to the output as a function of back EMF energy, wherein the switch does not provide supplemental load power to the output prior to closing the relay contacts.

2. The circuit of claim 1, further comprising a back EMF energy detecting component coupled to the relay coil and the switch and configured to detect the back EMF energy generated by the relay coil.

3. The circuit of claim 1, further comprising a back EMF energy receiving component coupled to the relay coil and configured to receive the back EMF energy generated by the relay coil and to provide a command signal to the switch in response to receiving the back EMF energy.

4. The circuit of claim 3 wherein the back EMF energy receiving component includes a diode coupled in series with the relay coil and configured to receive back EMF energy generated by the relay coil.

5. The circuit of claim 4 wherein the switch is a triac and the back EMF energy receiving component includes an opto triac driver.

6. The circuit of claim 3 wherein the back EMF energy receiving component generates a command signal having a gating pulse for controlling the switch.

7. The circuit of claim 1, further comprising a relay power source configured to provide relay activating energy to the relay coil, the relay coil being operable for closing the relay contacts in response to receiving relay activating energy from the relay power source.

8. The circuit of claim 7 wherein the relay power source includes a current limiter for providing a generally current limited relay activating energy to the relay coil.

9. The circuit of claim 1 wherein the load power is AC power and the relay contacts and switch are coupled to receive a single phase of the AC power and the relay coil generates back EMF energy to one or more switches each providing a different phase of the AC power to the output.

10. The circuit of claim 9 wherein the load power is three phase AC power and wherein the relay is a first relay and the switch is a first switch, further comprising a second relay with a second coil and a second set of contacts, and a second switch in parallel with the second contacts, a third relay with a third coil and a third set of contacts, and a third switch in parallel with the third contacts, each set of the first, second, and third relays and associated switches being configured to switch a different phase of the three phase AC load power.

11. The circuit of claim 9 wherein the switch is configured to terminate the providing of the supplemental AC load power to the output within one half of an AC power cycle following the back EMF energy being equal to a threshold level.

12. The circuit of claim 1 wherein the load power is DC power and the switch is a transistor, further comprising a diode coupled in series with the relay coil and configured to receive back EMF energy from the relay coil, the transistor being responsive to the back EMF energy received by the diode for providing the supplemental DC power to the power supply output.

13. The circuit of claim 1 wherein the switch is configured to terminate the providing of the supplemental load power to the output following the opening of the relay contacts.

14. The circuit of claim 1 wherein the switch is configured to provide supplemental load power to the output in response to the opening of the relay contacts and terminate the providing of the supplemental load power following the opening of the relay contacts.

15. A power supply having a relay for providing power to a load, the power supply comprising:

an input power source for providing load power;

an output configured for providing the load power to a load coupled to the power supply;

a relay having an activating coil and a set of relay contacts for providing a portion of the load power to the output, the relay coil being configured to close the relay contacts in response to receiving relay activating energy and to generate back EMF energy following termination of the receiving of relay activating energy; and a switch connected in parallel to the relay contacts being configured to provide a portion of the load power to the output as supplemental load power as a function of the back EMF energy generated by the relay coil wherein the switch does not provide supplemental load power to the output prior to closing the relay contacts.

16. The power supply of claim 15, further comprising a back EMF energy detection component coupled to the switch and configured to detect the back EMF energy generated by the relay coil.

17. The power supply of claim 15, further comprising a back EMF energy receiving component coupled to the relay coil and configured to receive the back EMF energy generated by the relay coil and to generate a control signal to the switch in response to receiving the generated back EMF energy, the switch being responsive to the control signal for providing the supplemental load power.

18. The power supply of claim 17 wherein the back EMF energy receiving component includes a diode coupled in series with the relay coil and configured to receive the back EMF energy generated by the relay coil.

19. The power supply of claim 18 wherein the switch is a triac and the back EMF energy receiving component includes an opto triac driver coupled to the diode for generating a gating pulse within the control signal to the triac.

20. The power supply of claim 18, further comprising a relay power source coupled to the relay coil and configured to selectively provide a current limited relay activating energy to the relay coil.

21. The power supply of claim 15 wherein the input power source is an AC power source providing AC load power and the relay coil generates back EMF energy to one or more switches each providing a different phase of the of AC load power.

22. The power supply of claim 21 wherein the relay is a first relay and the switch is a first switch, further comprising a second relay with a second coil and a second set of contacts, and a second switch in parallel with the second contacts, a third relay with a third coil and a third set of contacts, and a third switch in parallel with the third contacts, and wherein each set of first relay and first switch, second relay and second switch, and third relay and third switch are configured to selectively provide a different phase of the AC power.

23. The power supply of claim 21 wherein the switch is configured to terminate the providing of the supplemental load power to the output within one-half of an AC cycle following the back EMF energy being equal to a threshold level.

24. The power supply of claim 21 wherein the switch is configured to provide supplemental load power in response to the opening of the relay contacts and to discontinue the providing of supplemental load power following the opening of the relay contacts.

25. A power supply comprising:

an input power source for providing load power;

an output configured for providing the load power to a load coupled to the power supply;

a relay having a set of relay contacts for providing a portion of the load power to an output and an activating coil for closing the relay contacts in response to receiving relay activating energy;

a relay power source coupled to the relay coil for selectively providing current limited relay activating energy to the relay coil;

means for receiving back EMF energy generated by the relay coil following termination of the relay receiving relay activating energy; and a semiconductor switch connected in parallel to the relay contacts configured to provide a supplemental portion of the load power to the output in response to receiving the back EMF energy, wherein the switch does not provide supplemental load power to the output prior to closing the relay contacts.

26. The power supply of claim 25 wherein the input power source is an AC power source providing AC load power, the semiconductor switch being configured to terminate the providing of the load power to the output within one-half of an AC cycle following the back EMF energy being equal to a threshold level.

27. The power supply of claim 25 wherein the relay is a first relay, the semiconductor switch is a first semiconductor switch, the output is a first output, and the input power source is a three phase AC power source providing three phase load power, further comprising:

a second relay with a second relay coil and a second set of contacts, a second output, and a second semiconductor switch in parallel with the second contacts;

a third relay with a third relay coil and a third set of contacts, a second output, and a third semiconductor switch in parallel with the third contacts, wherein each set of relay contacts and semiconductor switches is configured to provide a different phase of the three phase AC load power to the associated outputs.

28. The power supply of claim 27 wherein the means for receiving back EMF energy by the first relay coils is a first means for receiving, further comprising a second means for receiving second back EMF energy generated by the second relay coil and a third means for receiving third back EMF energy generated by the third relay coil, wherein each set of semiconductor switches is configured to be responsive to the associated back EMF energy.

29. The power supply of claim 25 wherein the semiconductor switch is configured to provide supplemental load power in response to the opening of the relay contacts and to discontinue the providing of supplemental load power following the opening of the relay contacts.

30. A method of suppressing damaging arcing across relay contacts in a power switch having a relay with a set of relay contacts providing a portion of input power to an output and a relay coil configured to control the set of relay contacts in response to receiving relay coil activating energy, and an auxiliary switch connected in parallel to the relay contacts and configured to provide supplemental load power to the output, the supplemental load power being a portion of the input power, the method comprising:

receiving back EMF energy generated by the relay coil following termination of the relay coil receiving activating energy; and connecting the supplemental load power to the output in parallel with the relay contacts in response to the receiving of the back EMF energy, wherein the supplemental load power is not provided to the output prior to closing the relay contacts.

31. The method of claim 30, further comprising generating a control signal in response to the receiving of the back EMF energy generated by the relay coil, wherein connecting is in response to the control signal.

32. The method of claim 31 wherein generating the control signal includes generating a gating pulse in association with the opening of the relay contacts and terminating the gating pulse following the opening of the relay contacts.

33. The method of claim 30 wherein the input power source is an AC power source, further comprising terminating the connecting of supplemental load power to the output in parallel to the relay contacts within one half of an AC cycle following the back EMF energy being equal to a threshold level.

34. The method of claim 30, further comprising generating the relay activating energy for the relay coil having a current limit.

35. The method of claim 30 wherein the input power source is a DC power source.

36. The method of claim 30, further comprising detecting the opening of the relay contacts, wherein connecting supplemental load power is in response to detecting the opening of the relay contacts.

* * * * *

UNITED STATES PATENT AND TRADEMARK OFFICE
CERTIFICATE OF CORRECTION

PATENT NO. : 7,385,791 B2
APPLICATION NO. : 11/182048
DATED : June 10, 2008
INVENTOR(S) : Keith Douglas Ness It is certified that error appears in the above-identified patent and that said Letters Patent is hereby corrected as shown below:

<u>On the Title Page</u>

In column 1, item (75), after “Keith” delete “D” and substitute --Douglas-- in its place.

In column 1, item (73), before “Electric” delete “Wetlow” and substitute --Watlow-- in its place.

<u>In the Claims</u>

Column 13, line 41, immediately after “the relay coil” insert --,-- (comma).

Signed and Sealed this

Twenty-eighth Day of October, 2008

JON W. DUDAS
*Director of the United States Patent and Trademark Office*